Sept. 24, 1968  G. G. COOMBE  3,402,831
LOADING DEVICE FOR PALLETS
Filed April 2, 1965  4 Sheets-Sheet 1
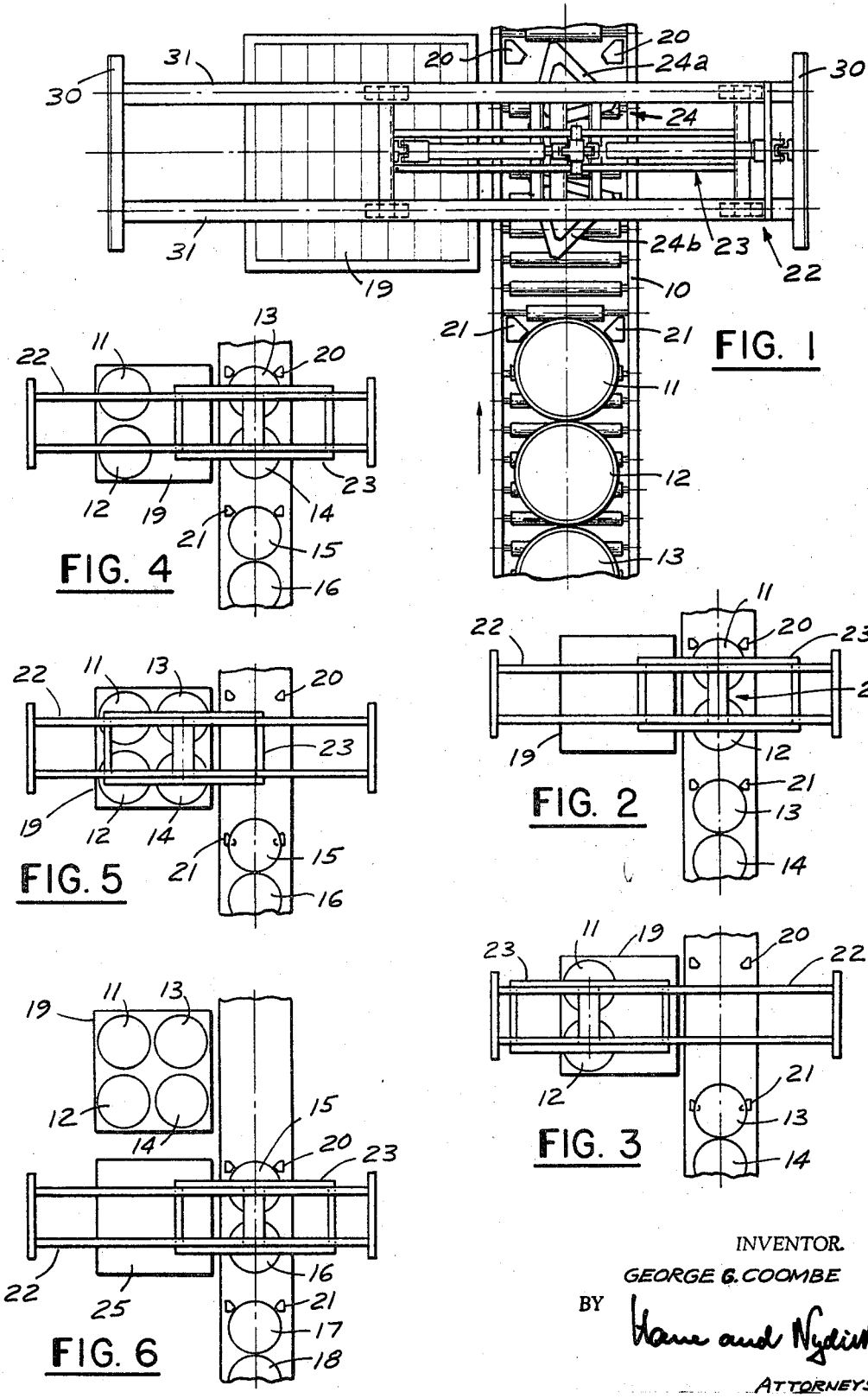
INVENTOR.
GEORGE G. COOMBE
BY Hane and Nydick
ATTORNEYS

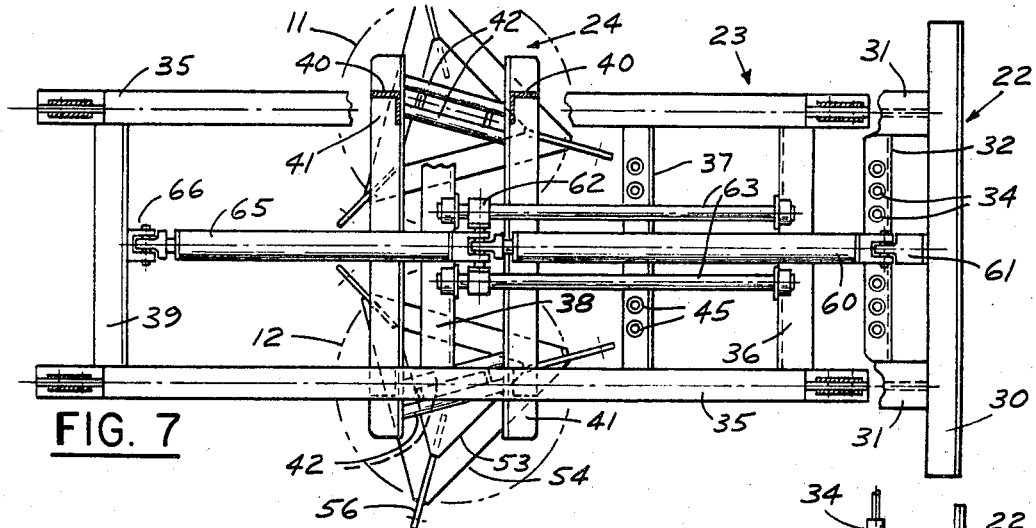
FIG. 7
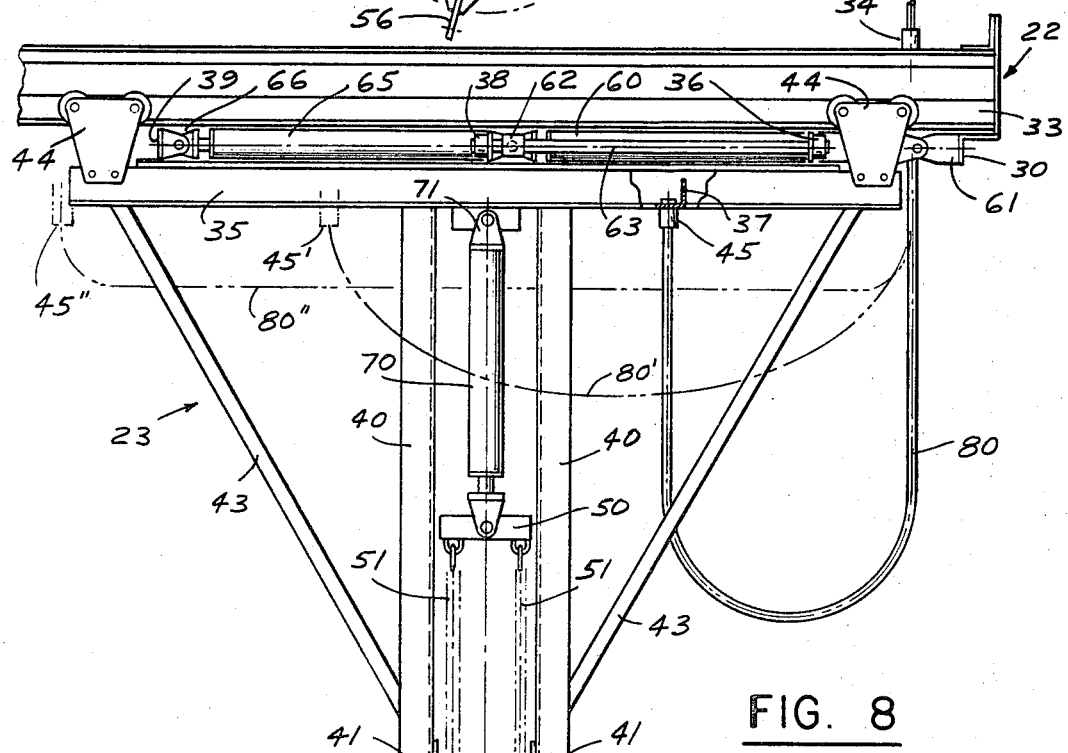
FIG. 8
INVENTOR.
GEORGE G. COOMBE
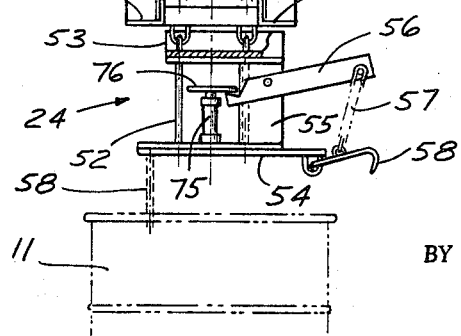
ATTORNEYS Sept. 24, 1968          G. G. COOMBE          3,402,831
LOADING DEVICE FOR PALLETS
Filed April 2, 1965          4 Sheets-Sheet 3
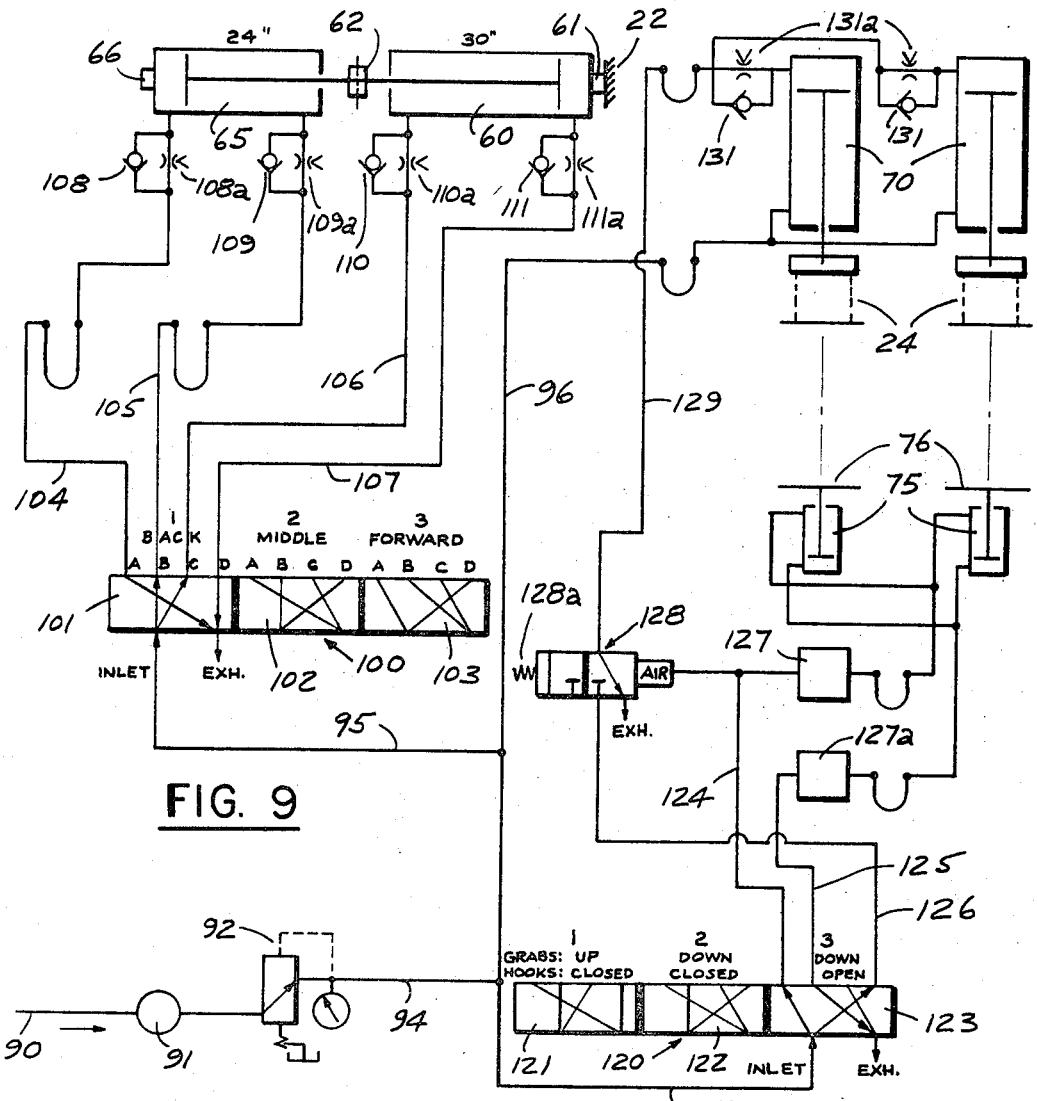
FIG. 9
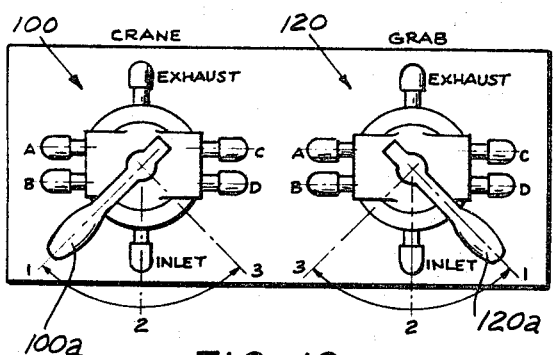
FIG. 10
| POS'N | A | B | C | D |
|---|---|---|---|---|
| 1 | EXH | PR | PR | EXH |
| 2 | EXH | PR | EXH | PR |
| 3 | PR | EXH | EXH | PR |
FIG. 11
INVENTOR.
GEORGE G. COOMBE
BY
Howe and Nydick
ATTORNEYS United States Patent Office 3,402,831
Patented Sept. 24, 1968

3,402,831
LOADING DEVICE FOR PALLETS
George G. Coombe, Bloomfield, N.J., assignor to Elbert Lively and Co., Inc., Bloomfield, N.J., a corporation of New Jersey
Filed Apr. 2, 1965, Ser. No. 444,954
6 Claims. (Cl. 214—6)

ABSTRACT OF THE DISCLOSURE

A pallet-loading device for transferring pairs of load units from a fixed loading position to a pallet so that a first pair of load units to be transferred occupies one part of the pallet and a second pair another part of the pallet, placement of successive pairs of load units upon the respective parts of the pallet being automatically effected by servo-operated transport and grab means.

---

Figure 12:
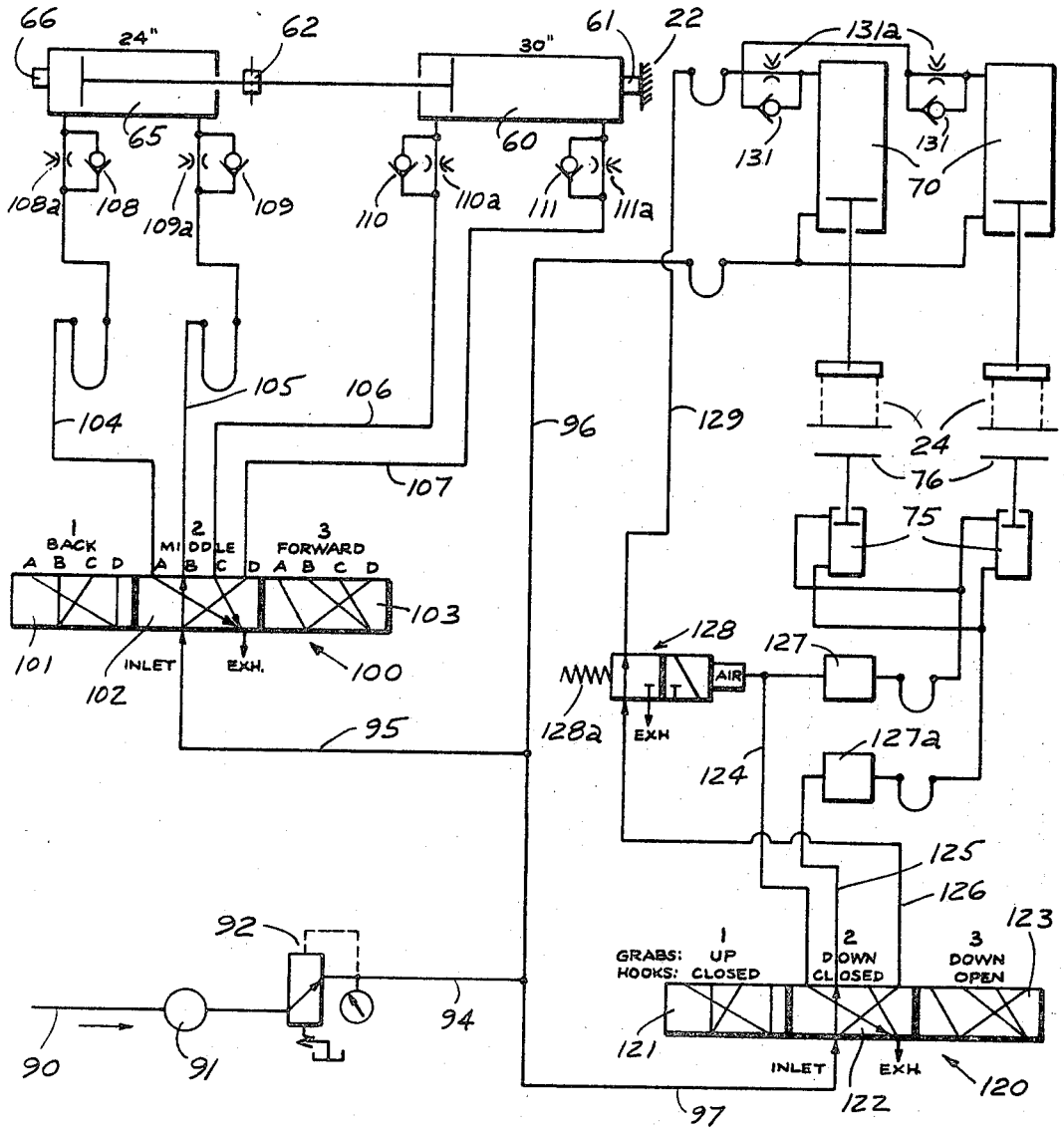

The present invention relates to a loading device for transferring units of a load, such as drums or barrels, from a loading station to which they are brought, for instance by a conveyor, to a pallet for further transport to a position of utilization or treatment.

It is customary practice to load each pallet with several units. In many instances four units are loaded upon a substantially square pallet before the same is removed for further handling.

In pallet-loading installations as heretofore known, the individual units—which more often than not are too heavy for manual lifting—are moved one by one from a conveyor upon a pallet by means of a suitable hoist or crane. As is evident, the correct placement of the units upon the pallet requires considerable skill on the part of the hoist or crane operator and is time-consuming.

It is a broad object of the invention to provide a novel and improved pallet-loading device of the general kind above referred to which greatly simplifies and expedites the loading of pallets with units placed, for instance, by means of a conveyor, in a predetermined loading position in reference to the pallet. While the invention is particularly advantageous for loading several units, such as four units upon each pallet, it should be understood that the invention is also useful for the loading of a single unit.

A more specific object of the invention is to provide a novel and improved pallet-loading device of the general kind above referred to by means of which each unit transferred from its loading position to the pallet is automatically placed upon the pallet in a predetermined position thereon.

Another more specific object of the invention is to provide a novel and improved pallet-loading device of the general kind above referred to by means of which a unit is simultaneously transferred from the loading position to the pallet and the unit is automatically set down upon the pallet in a predetermined position in reference to preceding or succeeding units on the pallet.

Still another more specific object of the invention is to provide a novel and improved pallet-loading device of the general kind above referred to by means of which several groups of units are successively transferred from the loading position to the pallet and each unit in each group is set down in a predetermined position on the pallet.

A further specific object of the invention is to provide a novel and improved device of the general kind above referred to by means of which, upon completion of an operational cycle, the pallet is loaded with the selected number of units and all the units are uniformly distributed on the pallet.

Other and further objects, features and advantages of the invention will be pointed out hereinafter and set forth in the appended claims constituting part of the application.

In the accompanying drawing a preferred embodiment of the invention is shown by way of illustration, and not by way of limitation.

In the drawing:
FIG. 1 is a plan view upon a pallet-loading device according to the invention;
FIG. 2 is a diagrammatic plan view showing the loading of a first pair of load units at the loading station;
FIG. 3 is a similar plan view showing the placement of the first pair of load units upon the pallet,
FIG. 4 is a similar plan view showing the loading of a second pair of load units;
FIG. 5 is a similar plan view showing the placement of the second pair of load units upon the pallet;
FIG. 6 is a similar plan view showing the pallet fully loaded with four units and the beginning of a second cycle by loading the first pair of the next set of four load units;
FIG. 7 is a plan view, partly in section, of the transport assembly and the grab assembly of the loading device on an enlarged scale;
FIG. 8 is an elevational view of FIG. 7;
FIG. 9 is a diagram of the drive means and the control means for the transport assembly and the grab assembly of the device, the drive means and the control means being shown set for loading a pair of load units in the loading station;
FIG. 10 is a diagrammatic plan view of valve means included in the control means of the device;
FIG. 11 is a schedule of the pressure conditions prevailing in the drive means in the different phases of the operational cycle thereof; and
FIG. 12 is a diagram similar to FIG. 9 but showing the drive means and the control means set for placing a second pair of load units upon the pallet.

Referring first to FIG. 1 in detail, this figure shows a conveyor 10 for transporting barrels or drums 11, 12, 13 in the direction indicated by the arrow. The conveyor should be visualized as a conventional conveyor of suitable design, such as a roller conveyor. The specific construction and arrangement of the conveyor do not constitute part of the invention. The conveyor may be terminated at the location at which barrels, drums or other units of load are to be transferred by the pallet-loading device according to the invention to a pallet 19, or it may be continued to other stations, as is indicated. If the conveyor is a continuous one, stops 20 are arranged to rise between the rollers of the conveyor to position the foremost drums or barrels to be loaded. A second set of stops 21 may also rise between the rollers and the stops may be synchronized with the stops 20 to hold back the line of barrels or drums after the two foremost barrels or drums are rolled into position for transfer to the pallet. The arrangement of synchronized stops suitable for the purpose and the control thereof should also be visualized as conventional and do not constitute part of the invention.

The pallet-loading device according to the invention comprises a stationarily mounted rail assembly 22; a transport or crane assembly 23 movably supported on said rail assembly for movement along the same between a loading station to which the load units such as drums or barrels to be loaded are transported by the afore-described conveyor and a receiving station in which the drums or barrels are placed upon a pallet 19 to be loaded with drums or barrels; and a movable grab assembly 24 for successively transferring drums or barrels arriving at the loading station and placing the same upon the pallet in predetermined positions.

The exemplified pallet-loading device is designed to load each pallet with four drums or barrels, which must be placed upon the pallet in substantially uniform distribution so that the pallet can accommodate the same and also so that the pallet is substantially balanced. More specifically, the exemplified pallet-loading device is designed for picking up or grabbing a first pair of drums or barrels and placing such pair upon the left or far half of the pallet and then picking up or grabbing a second pair of drums or barrels and placing the second pair upon the right-hand or near half of the pallet, whereupon a new cycle begins.

Turning now to FIGS. 2 through 6, these figures show diagrammatically a complete loading cycle. According to FIG. 2, a first pair of drums or barrels 11 and 12, which have been moved by conveyor 10 into the loading position, are ready to be grabbed by the grab assembly 24.

FIG. 3 shows said pair of barrels or drums 11 and 12 placed upon the far half of the pallet.

FIG. 4 shows the loading device in the position for grabbing a second pair of drums or barrels 13 and 14 now positioned ready for grabbing, a further pair of drums or barrels 15 and 16 being moved forward into a position in which they are stopped by stops 21.

FIG. 5 shows the second pair transported by the device and placed upon the near half of the pallet so that the same is now fully loaded.

FIG. 6 shows the loaded pallet removed from the discharge station and a second empty pallet 25 moved into the receiving position. Barrels or drums 15 and 16 are now in the position ready for grabbing, and a further pair of barrels or drums 17 and 18 are moved forward for grabbing.

Referring now to detailed FIGS. 7 and 8, the stationary rail structure 22 comprises an end member 30, two lengthwise rails 31 and an intermediate cross member 32. End member 30 should be visualized as being fixedly secured, for instance, to a support wall or to the floor. Rails 31 carry I-beams 33 for receiving trolleys 44. Cross member 32 supports an air hose manifold 34. Six air lines are indicated. The air lines should be visualized as being connected to a central control point. Six flexible hoses 80 are looped from manifold 34 to manifold 45 (positioned at 45' and 45" when operated).

The transport assembly 23 comprises two longitudinal members 35; four cross members 36 through 39; a vertical cage formed of four members 40 terminating in two bottom cross members 41; and four tubular members 42. The cage may be further strengthened by diagonal struts 43. The entire transport assembly is suspended by the trolleys 44 from I-beams 33. The aforementioned six-hose manifold 45 is secured to cross member 37.

The grab assembly 24 comprises two grab means 24a and 24b, one for each two drums or barrels to be simultaneously grabbed. Each grab means comprises an upper bar 50, two chains 51, two U-bolts 52, an upper triangular plate 53, a lower triangular plate 54, three lever supports 55, three levers 56, three chain links 57 and three hooks 58. Chains 51 are preferably passed through tubular members 42 to prevent rotating or swinging of the grab means.

An air cylinder 60 is secured at one end to a yoke 61 on member 30, which in turn is fixedly secured to a wall or other support, as previously mentioned. The other end of cylinder 60 is secured to a yoke and block assembly 62 slidable on rods 63 extending between cross members 36 and 38 secured thereto. The yoke and block assembly 62 is also yoked to one end of an air cylinder 65, the other end of which is secured to a yoke 66 on cross member 39.

Two air cylinders 70 are secured at one end to longitudinal members 35 at yokes 71. The lower ends of these cylinders are secured to bars 50. A further pair of air cylinders 75 are secured at one end to lower, preferably, triangular plates 54. The pistons in the air cylinders coact with, for instance, circular plates 76 to move plates 76 upwardly from the illustrated lowermost position. The two cylinders 70 are immovable in reference to each other. Six air hoses (not shown, for clarity of illustration) are connected between the manifold 45 and the three pairs of cylinders 60, 70 and 75.

By way of example, it may be assumed that each air cylinder 60 has an effective movement of 30 inches, and each air cylinder 65 an effective movement of 24 inches. Accordingly, movement of a pair of drums or barrels from the position of FIG. 2 into the forward or far half pallet position of FIG. 3 requires a movement of 54 inches, and a movement to the nearer or left half pallet position, a movement of 30 inches. Reverting to FIG. 7, an inspection of this figure in conjunction with the previous description thereof shows that an actuation of both pairs of cylinders 60 and 65 will cause the transport assembly 23 to move through a distance of 54 inches, and the actuation of the pair of cylinders 60 only will limit the movement of the transport assembly to 30 inches.

An examination of FIG. 8 in the light of the previous description further shows that actuation of cylinders 70 in the position illustrated in FIG. 8 will cause lowering of a grabbed drum or cylinder 11; vice versa, actuation of the cylinders when the same are in the extended position will cause lifting of a grabbed drum or barrel.

Cylinders 75 will hold hooks 58 in the illustrated open position by means of plates 76, levers 56 and chain links 57 when the cylinders themselves are in the illustrated positions. Actuation of cylinders 75 will cause lowering or closing of the hooks for grabbing a drum or barrel.

The cycle of operation

To effect loading of a pallet with four drums, as diagrammatically illustrated in FIGS. 2 through 6, the following operational steps must be carried out:

(1) Transport assembly 23 and grab assembly 24 are moved into the grab position above the loading station (FIG. 2).
(2) Two drums 11 and 12 are moved along the conveyor 10 until stops 20 are reached (FIG. 2).
(3) The grab assembly is operated to lower its grabs with hooks open, and the hooks are closed after a time delay.
(4) The grabs pick up the two drums and seat the same close to the transport assembly 23.
(5) The transport assembly 23 is moved along the rail assembly 22 into a first or forward predetermined position in which the drums are suspended above the far end of the pallet 19 (FIG. 3).
(6) The grab assembly 24 is actuated to lower the grabs and to open the hooks 58 to place drums 11 and 12 upon the far half of pallet 19.
(7) The grab assembly 24 is actuated to open the hooks and to pull the same up close to the rail assembly 22.
(8) The transport assembly 23 is moved back until the grab assembly 24 is again above the conveyor 10 (FIG. 4).
(9) The next two drums 13 and 14 are moved along the conveyor until they are stopped by stops 20 (FIG. 4).
(10) The second pair of drums 13 and 14 are picked up by operating the grab assembly 24 as described in points 3 and 4.
(11) The transport assembly 23 is again operated to move the grab assembly 24 into a second predetermined position in which the drums are suspended above the near half of the pallet 19 (FIG. 5).
(12) The grab assembly 24 is operated as described in points 6 and 7 to place the second pair of drums 13 and 14 upon the near half of the pallet 19 (FIG. 6).

The pallet-loading cycle is now completed. The loaded pallet 19 may now be taken away and an empty pallet 25 positioned. The transport assembly 23, together with the grab assembly 24, can now be returned into the position of FIG. 2 to grab another pair of drums 15 and 16.

FIGS. 9 through 12 exemplify several of the aforelisted operations of the transport assembly 23 and the grab assembly 24. All other operations within the cycle will be self-evident from the ones described in detail.

First referring to FIG. 10, this figure shows diagrammatically two control valves 100 and 120. The two control valves are alike and should be visualized as being conventional in design. Each control valve may be placed into one of three positions by means of control handles 100a and 120a respectively and is connected in these positions through ports A, B, C and D either to an inlet for a pressure medium, such as pressurized air, or to an exhaust outlet.

FIG. 11 tabulates the connections of the ports in the different positions of control handles 100a and 120a of the two valves.

Control valve 100 serves to control the transport assembly 23, and control valve 120 to control the grab assembly 24. In position 1 of control valve 100 the transport assembly is placed in the position above the loading station—that is, above the conveyor 10; in position 2, in the position above the near half of the pallet—that is, in the second predetermined position; and in position 3, above the far half of the pallet—that is, in the first predetermined position.

Control valve 120 in its position 1 lowers the grabs with hooks 58 open; in position 2, the grabs stay lowered but the hooks are closed; and in position 3, the grabs are raised with the hooks closed.

Both valves are shown in position 1; that is, the transport assembly is, as stated before, above the conveyor with the grabs lowered and the hooks open, which is the position of FIG. 2.

Turning now to FIG. 9, this figure shows a diagram of the control system of the pallet-loading device. More specifically, this figure shows the components of the control system as occupying the positions into which they are moved by placing the control handles of valves 100 and 120 in the position 1. It is assumed that the control handles have been moved from the forward position (position 3), in which the drums 11 and 12 have been placed upon the far half pallet 19, into the back position (position 1) for loading the second pair of drums (drums 13 and 14) and also for readying the grabs for grabbing said second pair of drums. Cylinders 60, 65, 70 and 75 and the associated pistons are all shown as having arrived in the positions demanded by position 1 of the two control valves.

As is apparent from FIG. 9, in position 1 of control handle 100a, pressure air from an air supply 90 passes through a filter 91 and a conventional pressure regulator 92 through pipes 94 and 95 to control valve assembly 101 for transport assembly 23. The valving effected by this assembly and also by control valve assembly 123 for the grab assembly 24 are indicated by upwardly and downwardly directed arrows. All upwardly directed arrows are connected or connectible to components of a servo system, as will be more fully described hereinafter, and all downwardly directed arrows lead to an exhaust. Four valve ports A, B, C and D for each valve assembly are shown. Reference is made in this connection to FIG. 11, which, as previously pointed out, shows the pressure conditions prevailing in each of the three handle positions. The ports are connected by pipes 104, 105, 106 and 107 to cylinders 65 and 60, respectively. A one-way check valve, 108, 109, 110 and 111, respectively, and a preferably adjustable throttling by-pass valve 108a, 110a and 111a, respectively, are included in each of the pipe lines.

The pressure air at ports B and C of valve assembly 103 is fed through pipes 105 and 106, including check valves 109 and 110, to the right-hand side of cylinder 65 and the left-hand side of cylinder 60.

As is apparent from the previous description, cylinders 60 and 65 are positioned in the forward position of the transport assembly 23 so that the grabs are above the far half of the pallet and in the back position of the transport assembly so that the grabs are above the conveyor. The cylinders are shown in FIG. 9 in the latter position and are moved into this position by the action of the pressure air fed through pipes 105 and 106. More specifically, the action of the pressure air causes point 66, anchored to the transport assembly, to move to the right with respect to point 62, anchored to the transport assembly, and point 62 toward the right with respect to point 22, anchored to the wall or other fixed point.

The pressure air exits from cylinder 65 via throttling valve 108a, pipe 104 and exahust port A, and from cylinder 60 via throttling 111a, pipe 107 and exhaust port D. The pressure air through pipe 94 is also supplied through pipe 97 to grab control assembly 123. It passes through ports A and D thereof and pipes 124 and 126, respectively, to a conventional air control valve 128, where the pressure air flow is exhausted, and an air stop in the valve, respectively. This position of valve 128 is diagrammatically indicated by the locations of the ports within the valve and also by the compression of a spring 128a.

Pressure air also passes through a pipe 96 to the lower side of both cylinders 70, thereby causing lifting of both grabs, the grabs being shown in the raised position in FIG. 8. The pressure air exits through throttling valves 131a, pipe 129 and valve 128.

The pressure air in pipe 124, after a suitable predetermined time delay by means of a conventional time delay device 127, is fed to the top side of cylinders 75, thereby causing opening of grab hooks 58, via plates 76, levers 56 and chain links 57, as previously described. The pressure air exits from cylinders 75 through a conventional time delay device 127a and port B of grab valve assembly 123. Accordingly, the grabs are readied for loading a pair of drums when the levers of both valve assemblies are in position 1, as shown in FIG. 9.

To grab a pair of drums, the control handle for grab valve assembly 123 is placed in the middle position; that is, in position 2. FIG. 12 shows the grab control handle in that position. As is apparent from this figure, pressure air is now supplied through port D and pipe 126 to air control valve 128 and is exhausted through port A. As a result, air control valve 128 is now positioned to open an air flow through check valves 131 to the top of cylinders 70. (The present position of valve 128 is indicated by showing spring 128a relaxed and the changed positions of the ports.) Accordingly, the grabs are now lowered. A flow of pressure air from port B through pipe 125 to the bottom side of cylinders 75 causes closing of the grab hooks after a predetermined time delay controlled by time delay control device 127a. Pressure air is exhausted from the top of cylinders 75 through time delay device 127, pipe 124 and port A.

Accordingly, the drums are now grabbed by the grabs. To lift the drums, grab control handle 120a is now moved into position 3. As can be readily ascertained from the foregoing description and an analysis of FIGS. 9 through 12, such positioning of the grab control handle will cause lifting of the grabs. The control handle 100a for the transport assembly 23 is now moved either into position 3 (the forward position) or position 2 (the middle position), depending upon whether drums 11 and 12 are to be transported to the far half of pallet 19, or drums 13 and 14 to the near half of the pallet. FIG. 12 shows placement of lever 100a in position 2. Pressure air is now supplied to the right-hand side of cylinder 60 from port D and is exhausted through port C. Pressure air is also supplied to the right side of cylinder 65 through port B and is exhausted through port A. As a result, the two cylinders and the pistons therein will be moved in the positions shown in FIG. 12, and the lifted grabs supporting drums 13 and 14 are now above the near half of the pallet. The grab handle 120a is now moved from the forward position into the middle position (position 2), whereby the grabs are lowered and then opened to place the drums upon the near half of the pallet.

The control of the transport of drums 11 and 12 from the loading position to the far half of the pallet will be evident from the previous description and an analysis of FIGS. 9 through 12.

While the invention has been described in detail with respect to certain now preferred example and embodiment of the invention, it will be understood by those skilled in the art, after understanding the invention, that various changes and modifications may be made without departing from the spirit and scope of the inveniton, and it is intended, therefore, to cover all such changes and modifications in the appended claims.

What is claimed is:

1. A pallet-loading device for transferring pairs of load units from a fixed loading position to a pallet, said device comprising a loading station, said station including conveyor means for successively moving load units into a predetermined fixed loading position for load units to be transferred, and means for arresting successive pairs of load units in said loading position; a stationary rail assembly; a transport assembly slidably supported on said rail assembly, said transport assembly being selectively movable between said predetermined loading position and a predetermined first discharge position for discharging a first load unit of a pair upon the pallet or a second predetermined discharge position spaced apart from the first one for discharging the second unit of said pair upon the pallet side by side with the first load unit; a grab assembly for grabbing a load unit in the loading position and discharging the grabbed unit, said grab assembly being suspended from said transport assembly for movement in unison therewith; drive means coacting with said transport assembly and said grab assembly to actuate said assemblies for the purposes aforesaid; said drive means including a pair of pressure fluid-operated servomechanisms arranged in tandem, said mechanisms being operatively coupled to said rail assembly and the slidable transport assembly, respectively, actuation of one of said mechanisms by said drive means moving said transport assembly between said second discharge position and said loading position and actuation of both said mechanisms moving said transport assembly between said first discharge position and said loading position; and control means for controlling said drive means to actuate sequentially said transport assembly and said grab assembly for respectively moving into the loading position, grabbing the first unit, moving the same into the first discharge position, discharging the grabbed first unit at said position upon the pallet, returning into the loading position, grabbing the second unit, moving the same into the second discharge position and discharging the grabbed second unit in said second discharge position upon the pallet.

2. A pallet-loading device according to claim 1, wherein said drive means also comprises a further pressure-fluid-operated servomechanism supported by the transport assembly and operatively coupled with said grab assembly, said further servomechanism when actuated grabbing a unit to be loaded and releasing the same for placement upon the pallet.

3. A pallet-loading device according to claim 2, wherein said control means comprise a source of a pressure fluid, a first multiposition valve means for connecting said source of pressure fluid to said pair of servomechanisms for the transport assembly, and a second multiposition valve means for connecting said source of pressure fluid to said servomechanism for the grab assembly, the actuation of each of said mechanisms for the purposes aforesaid being controlled by positioning the respective valve means.

4. A pallet-loading device according to claim 1, wherein said first discharge position is located at a predetermined fixed distance from said loading position and said second discharge position is located at a fixed position intermediate said first discharge position and said loading position.

5. A pallet-loading device according to claim 1, wherein said grab assembly comprises several grab means disposed crosswise of the direction of movement of said assembly in unison with the transport assembly, each of said grab means grabbing and discharging, respectively, a unit upon actuation of said grab assembly by said drive means.

6. A pallet-loading device for loading several load units upon a pallet, said device comprising a stationary rail assembly including substantially horizontal guide tracks, a loading station for load units to be transferred, said station including conveyor means for successively moving load units into a predetermined loading position for load units to be transferred and means for arresting successive pairs of load units in said loading position, said loading station being disposed below one end of said tracks, a discharge station for discharging pairs of load units upon a pallet placed in the discharge station, said discharge station being disposed below the other end of said tracks, a transport assembly slidably supported upon said tracks for movement along the same between said two stations, a grab assembly suspended from said transport assembly and including two grab means for simultaneously grabbing in the loading station and discharging upon the pallet, respectively, a pair of load units arrested in the loading station and disposed substantially crosswise of the direction of movement of the transport assembly, first drive means for selectively moving the transport assembly between a position in which the grab means overhang the loading station and a first fixed position in the discharge station in which the grab means overhang a far part of the pallet in reference to the loading station and also between a position in which the grab means overhang the loading station and a second fixed position in the discharge station in which the grab means overhang a nearer part of the pallet in reference to the loading station, said first drive means including a pair of servomechanisms arranged in tandem, said mechanisms being cooperatively coupled to said rail assembly and said transport assembly to control the position of the transport assembly on the rail assembly, actuation of both said servomechanisms by said first drive means moving the transport assembly between the position in which the grab means overhang the loading station and the position in which the grab means overhang the far part of the pallet, and actuation of one of said servomechanisms by said first drive means moving the transport assembly between a position in which the grab means overhang the loading station and the position in which the grab means overhang the near part of the pallet, second drive means for actuating the grab means for the purpose aforesaid, first control means for activating the first drive means to move the transport assembly sequentially into the aforesaid positions, and second control means for activating the second drive means to effect grabbing and discharging, respectively, of pairs of load units to be transferred from the loading station to the pallet.

References Cited

UNITED STATES PATENTS

| | | | |
|---|---|---|---|
| 2,864,516 | 12/1958 | Rogers | 214—6 |
| 2,980,265 | 4/1961 | Johnson et al. | 214—6 |
| 3,090,502 | 5/1963 | Gunzelmann | 214—6 |

FOREIGN PATENTS 964,411   7/1964   Great Britain.

ROBERT G. SHERIDAN, *Primary Examiner.*

G. F. ABRAHAM, *Assistant Examiner.*